United States Patent
Dharia et al.

(10) Patent No.: US 12,333,819 B2
(45) Date of Patent: Jun. 17, 2025

(54) AUTONOMOUS VEHICLE SENSOR SECURITY, AUTHENTICATION AND SAFETY

(71) Applicant: Waymo LLC, Mountain View, CA (US)

(72) Inventors: Nirav Dharia, Milpitas, CA (US); Xiaoli Lu, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/501,208

(22) Filed: Nov. 3, 2023

(65) Prior Publication Data

US 2024/0062554 A1 Feb. 22, 2024

Related U.S. Application Data

(62) Division of application No. 17/703,223, filed on Mar. 24, 2022, now Pat. No. 11,854,269.

(Continued)

(51) Int. Cl.
*G06V 20/56* (2022.01)
*B60W 50/02* (2012.01)
(Continued)

(52) U.S. Cl.
CPC ......... *G06V 20/56* (2022.01); *B60W 50/0205* (2013.01); *B60W 60/00* (2020.02);
(Continued)

(58) Field of Classification Search
CPC ...... G06V 20/56; G06V 10/759; G06V 10/82; G06V 10/803; G06V 10/98;
(Continued)

(56) References Cited

U.S. PATENT DOCUMENTS

| 4,200,770 A | 4/1980 | Hellman et al. |
| 9,916,259 B1 | 3/2018 | Nordin et al. |

(Continued)

FOREIGN PATENT DOCUMENTS

| CN | 105512640 A | 4/2016 |
| KR | 20210034097 A | 3/2021 |

(Continued)

OTHER PUBLICATIONS

Dessouky, G., et al., "SoK: Secure FPGA Multi-Tenancy in the cloud : Challenges and Opportunities," IEEE European Symposium on Security and Privacy, 2021, pp. 2. DESSOUKY_FPGA_IEEE_2021_2Pgs_EFS.

(Continued)

*Primary Examiner* — Carol W Chan
(74) *Attorney, Agent, or Firm* — Lowenstein Sandler LLP

(57) ABSTRACT

A method includes obtaining, by a processing device, an impact analysis configuration related to an image sensor operation type for an autonomous vehicle (AV), receiving, by the processing device, image data from a sensing system including at least one image sensor of the AV, causing, by the processing device, fault detection to be performed based on the image data, causing, by the processing device, a fault notification to be generated using the impact analysis configuration, and sending, by the processing device to a data processing system of the AV, the fault notification to perform at least one action to address the fault notification. The fault notification includes a fault summary related to the image sensor operation type.

20 Claims, 7 Drawing Sheets

Related U.S. Application Data

(60) Provisional application No. 63/197,039, filed on Jun. 4, 2021.

(51) Int. Cl.
*B60W 60/00* (2020.01)
*G06V 10/75* (2022.01)
*G06V 10/80* (2022.01)
*G06V 10/98* (2022.01)

(52) U.S. Cl.
CPC .......... *G06V 10/759* (2022.01); *G06V 10/803* (2022.01); *G06V 10/98* (2022.01); *B60W 2050/0215* (2013.01); *B60W 2420/403* (2013.01)

(58) Field of Classification Search
CPC ............. B60W 50/0205; B60W 60/00; B60W 2050/0215; B60W 2420/403
See application file for complete search history.

(56) References Cited

U.S. PATENT DOCUMENTS

| | | | |
|---|---|---|---|
| 10,710,719 B1* | 7/2020 | Lott, III | ................ G01S 1/0423 |
| 11,038,897 B1 | 6/2021 | Wilson et al. | |
| 11,144,911 B2 | 10/2021 | Smith et al. | |
| 2009/0138946 A1 | 5/2009 | Schneider et al. | |
| 2009/0141166 A1 | 6/2009 | Kim | |
| 2015/0052351 A1 | 2/2015 | Nodehi Fard Haghighi et al. | |
| 2016/0134419 A1 | 5/2016 | Smith et al. | |
| 2017/0026176 A1 | 1/2017 | Schmidt et al. | |
| 2017/0063853 A1 | 3/2017 | Lim | |
| 2017/0132477 A1 | 5/2017 | Kim et al. | |
| 2017/0244565 A1 | 8/2017 | Bronk | |
| 2017/0285633 A1 | 10/2017 | Poornachandran et al. | |
| 2017/0324566 A1 | 11/2017 | Kawasaki et al. | |
| 2017/0346640 A1 | 11/2017 | Smith et al. | |
| 2018/0069708 A1 | 3/2018 | Thakore | |
| 2018/0103036 A1 | 4/2018 | Fox et al. | |
| 2018/0204399 A1 | 7/2018 | Newman | |
| 2018/0323977 A1 | 11/2018 | Hojsik et al. | |
| 2019/0057268 A1 | 2/2019 | Burge | |
| 2019/0068582 A1 | 2/2019 | Kim et al. | |
| 2019/0159762 A1 | 5/2019 | Li | |
| 2019/0208442 A1 | 7/2019 | Amorim De Faria Cardote | |
| 2019/0281052 A1 | 9/2019 | Lekkas | |
| 2020/0045540 A1 | 2/2020 | Hutchison et al. | |
| 2020/0092113 A1 | 3/2020 | Hutchison et al. | |
| 2020/0145409 A1 | 5/2020 | Pochuev et al. | |
| 2020/0159930 A1 | 5/2020 | Venkateswaran et al. | |
| 2020/0193065 A1 | 6/2020 | Smith | |
| 2020/0259885 A1 | 8/2020 | Alam et al. | |
| 2020/0293042 A1* | 9/2020 | Sakurada | ............. G05D 1/0293 |
| 2020/0313873 A1 | 10/2020 | Mondello et al. | |
| 2020/0313909 A1 | 10/2020 | Mondello et al. | |
| 2020/0313911 A1 | 10/2020 | Mondello et al. | |
| 2021/0003711 A1* | 1/2021 | Vandenberg, III | ...... G01S 17/93 |
| 2021/0035279 A1* | 2/2021 | Hu | ...................... H04N 17/002 |
| 2021/0092604 A1 | 3/2021 | Fox et al. | |
| 2021/0117242 A1 | 4/2021 | Van De Groenendaal et al. | |
| 2021/0176071 A1 | 6/2021 | Maass et al. | |
| 2021/0203492 A1 | 7/2021 | Soares De Resende et al. | |
| 2021/0284140 A1* | 9/2021 | Hayakawa | ........ B60W 50/0205 |
| 2021/0288822 A1 | 9/2021 | Sorensen et al. | |
| 2021/0306141 A1 | 9/2021 | Ruth et al. | |
| 2021/0362733 A1* | 11/2021 | Yoon | ...................... H04N 17/00 |
| 2022/0032955 A1* | 2/2022 | Xiang | ................. B60W 50/029 |
| 2022/0073106 A1* | 3/2022 | Ahn | ...................... G08G 1/097 |
| 2022/0100579 A1 | 3/2022 | Lal et al. | |
| 2023/0076669 A1 | 3/2023 | Acharya et al. | |
| 2023/0198784 A1 | 6/2023 | Miller et al. | |
| 2023/0403552 A1 | 12/2023 | Ishiguro | |
| 2024/0007286 A1* | 1/2024 | Miyamoto | ............. H04L 9/088 |

FOREIGN PATENT DOCUMENTS

| | | | |
|---|---|---|---|
| SG | 10201911787 Y | * | 1/2020 |
| WO | 2007067722 A2 | | 6/2007 |
| WO | 2014082483 A1 | | 6/2014 |
| WO | WO-2020243484 A1 | * | 12/2020 .......... B60W 30/146 |

OTHER PUBLICATIONS

Eftekhari, S.A., et al., "Robust session key generation protocol for social internet of vehicles with enhanced security provision," The Journal of Supercomputing, 2020, pp. 2511-2544.

Ho J. Y., et al., "Secure Sensing Inputs for Autonomous Vehicles," IEEE Xplore, 2017, pp. 1978-1983.

Liu S., et al., "Computer Architectures for Autonomous Driving," Computer Design Starts Over, 2017, pp. 18-25.

Lopez A., et al., "Security of Emergent Automotive Systems: A Tutorial Introduction and Perspectives on Practice," IEEE Design Test, 2019, pp. 10-38.

Scales M., et al., "Automotive Cybersecurity Foundations for Next-Ganaration Vehicles," IEEE, 2019, 06 Pages.

Sharma C., et al., "Review of the Security of Backward-Compatible Automotive Inter-ECU Communication," IEEE Access, 2021, vol. 4, pp. 01-16.

Web: "Automated Driving Licensing System Based on Wireless Sensor Networks and IOT," InnovationQ+IP, IEE, 2023, 1 Page, Retrieved from [https://iq.ip.com/discover].

* cited by examiner

AUTONOMOUS VEHICLE SENSOR SECURITY, AUTHENTICATION AND SAFETY

CROSS-REFERENCE TO RELATED APPLICATION(S)

The present application is a divisional of U.S. patent application Ser. No. 17/703,223, filed on Mar. 24, 2022, which claims the benefit of U.S. Provisional Application 63/197,039, filed on Jun. 4, 2021, the entire contents of which are hereby incorporated by reference herein.

TECHNICAL FIELD

The instant specification generally relates to autonomous vehicles. More specifically, the instant specification relates to autonomous vehicle sensor security, authentication and safety.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the driving environment based on the sensed data. The driving path can be determined based on Global Positioning System (GPS) data and road map data. While the GPS and the road map data can provide information about static aspects of the driving environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the driving environment and to provide correct instructions to the vehicle controls and the drivetrain.

SUMMARY

In one implementation, disclosed is a method. The method includes receiving, by a processing device from a sensing system of an autonomous vehicle (AV), image data. The image data includes first image data generated by a first image sensor of the sensing system and second image data generated by a second image sensor of the sensing system. The first image sensor is operatively coupled to a first image capturing device and the second image sensor is operatively coupled to a second image capturing device. The method further includes determining, by the processing device for a frame, whether an amount of image data matching between the first image data and the second image data satisfies a first threshold condition, in response to determining that the amount of image data matching satisfies a first threshold condition, identifying, by the processing device, the frame as invalid, determining, by the processing device, whether a number of consecutive frames determined to be invalid satisfies a second threshold condition, and in response to determining that the number of consecutive frames determined to be invalid satisfies the second threshold condition, generating, by the processing device, a notification that the sensing system is outputting invalid data.

In another implementation, disclosed is a system. The system includes a memory device, and a processing device, operatively coupled to the memory device, to perform operations including receiving, from a sensing system of an autonomous vehicle (AV), image data. The image data includes first image data generated by a first image sensor of the sensing system and second image data generated by a second image sensor of the sensing system. The first image sensor is operatively coupled to a first image capturing device and the second image sensor is operatively coupled to a second image capturing device. The operations further include determining, for a frame, whether an amount of image data matching between the first image data and the second image data satisfies a first threshold condition, in response to determining that the amount of image data matching satisfies a first threshold condition, identifying the frame as invalid, determining whether a number of consecutive frames determined to be invalid satisfies a second threshold condition, and in response to determining that the number of consecutive frames determined to be invalid satisfies the second threshold condition, generating a notification that the sensing system is outputting invalid data.

In yet another implementation, disclosed is a method. The method includes obtaining, by a processing device, an impact analysis configuration related to an image sensor operation type for an autonomous vehicle (AV), receiving, by the processing device, image data from a sensing system including at least one image sensor of the AV, causing, by the processing device, fault detection to be performed based on the image data, causing, by the processing device, a fault notification to be generated using the impact analysis configuration, and sending, by the processing device to a data processing system of the AV, the fault notification to perform at least one action to address the fault notification. The fault notification includes a fault summary related to the image sensor operation type.

In yet another implementation, disclosed is a system. The system includes a memory device, and a processing device, operatively coupled to the memory device, to perform operations including obtaining an impact analysis configuration related to an image sensor operation type for an autonomous vehicle (AV), receiving image data from a sensing system including at least one image sensor of the AV, causing fault detection to be performed based on the image data, causing a fault notification to be generated using the impact analysis configuration, and sending, to a data processing system of the AV, the fault notification to perform at least one action to address the fault notification. The fault notification includes a fault summary related to the image sensor operation type.

In yet another implementation, disclosed is a system. The system includes a sensing system of an autonomous vehicle (AV), a data processing system of the AV, a set of fault detectors, a memory device, and a processing device, operatively coupled to the memory device, to perform operations including obtaining an impact analysis configuration related to an image sensor operation type for the AV, receiving image data from the sensing system, causing fault detection to be performed based on the image data, causing a fault notification to be generated using the impact analysis configuration, and sending, to the data processing system, the fault notification to perform at least one action to address the fault notification. The set of fault detectors includes at least one of: a temperature monitor to detect temperature faults, a dual lock step to detect processor error faults, or an exposure monitor to compare a distribution of image pixel intensity data with ambient light sensor data. The fault notification includes a fault summary related to the image sensor operation type.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
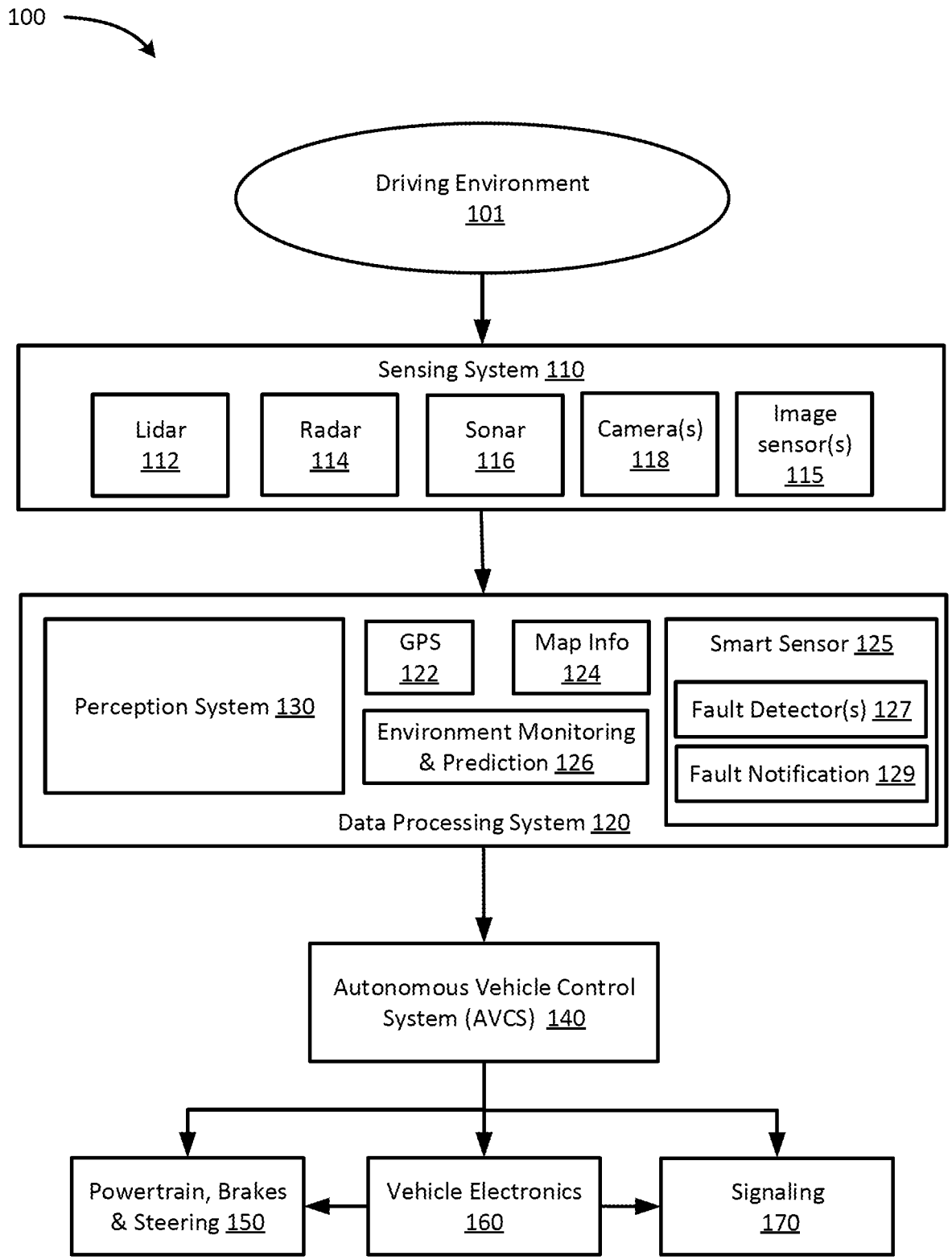
FIG. 1 is a diagram illustrating components of an example autonomous vehicle (AV), in accordance with some implementations of the present disclosure.

An autonomous vehicle (AV) can include a sensing system. The sensing system can include a number of image capturing devices each operatively coupled to a respective image sensor. For example, an image sensor can be included within an image capturing device. Image sensors can include camera image sensors, light detection and ranging (lidar) sensors, radar sensors, etc. An image sensor can include a number of light-sensing pixels that measure an intensity of incident light to collectively capture an image of an environment. A frame rate may be applied to an image sensor to allow the image sensor to generate images of the environment. An image sensor can be a low-power sensor and/or a special-purpose sensor with a small processor. However, an image sensor can be any suitable image sensor in accordance with the implementations described herein.

Image data obtained by the sensing system (e.g., generated by the image sensors) can be provided to a data processing system of the AV. The data processing system of the AV can process the image data to control safety-critical functions implemented by an AV control system (AVCS). One example of a safety-critical function is vehicle trajectory. Since image sensors can be used to control AV safety-critical functions, image sensor security is becoming an increasingly important aspect to ensure safe AV operation and performance. However, image sensor security has not been adequately addressed in a way that provides a most secure solution. For example, typical image sensor security solutions do not address fundamental security concerns, especially when an adversary has physical access to a sensor in an AV system. Examples of AV systems include Transportation-as-a-Service (TaaS) vehicle systems. For example, an AV can be a multitenant AV for transporting multiple passengers, such as a multitenant public transportation vehicle or taxi. Additionally or alternatively, the sensing system (e.g., at least one image sensor) may be generating invalid data that may be indicative of sensing system compromise (e.g., tampering).

Aspects of the disclosure address the above challenges, along with others, by implementing autonomous vehicle (AV) sensor security, authentication and safety. In some implementations, the AV is implemented as a multitenant AV (e.g., multitenant public transportation vehicle or multitenant taxi). For example, implementations described herein can provide for validation of image sensor data generated by image sensors of sensing systems. Implementations described herein can improve image sensor safety and security by assessing if at least one of the image sensors has been compromised (e.g., tampered with) based on data obtained from the image sensors, thereby performing data authentication or verification.

For example, an AV can include a sensing system and a data processing system. The sensing system can include at least one image sensor operatively coupled to at least one image capturing device (e.g., camera). The AV can further include a smart sensor. The smart sensor can be included within the sensing system or the data processing system.

In some implementations, the smart sensor can include an integrated circuit that can implement an image sensor data stream safety authentication mode. In some implementations, the at least one image sensor can include a pair of image sensors each operatively coupled to a respective image capturing device. Each image sensor can cover a respective set of regions of interest (ROIs) that each correspond to a portion of a field of view of the image capturing device. In some implementations, each set of ROIs includes at least 3 ROIs. Alternatively, other numbers of ROIs can be used.

Image data (e.g., image metadata) can correspond to a number of frames. For example, a given frame can include multiple images—e.g., an image obtained by a first image capturing device and an image obtained by a second image capturing device. Each image sensor can divide an image into multiple ROIs that each correspond to a portion of a field of view of the image capturing device. The smart sensor can, for a given frame, compare respective image data of different image sensors based on individual ROIs. For example, two ROIs of two different image sensors can correspond to the same portion of the field of view. The correspondence between the ROIs of the different sensors can be determined based on the type of image data (e.g., image metadata) being compared. Based on the comparison, the smart sensor can determine whether an amount of image data matching between the two image sensors with respect to the corresponding ROIs indicates image sensor compromise. For example, the smart sensor can determine whether the amount of image data matching satisfies a first threshold condition (e.g., whether the amount of image data matching is below a first threshold). If not (e.g., if the amount of image data matching exceeds the first threshold), then it can be decided that there is no image data mismatch. Alternatively, if the amount of image data matching satisfies the threshold condition (e.g., if the amount of image data matching is below the first threshold), this may be indicative of image sensor compromise. To address the possibility of false positive results, further comparison can be performed in relation to consecutive frames until a number of consecutive frames that have an insufficient amount of image data matching satisfies a second threshold condition (e.g., the number of such consecutive frames exceeds a threshold number of consecutive frames). If the second threshold condition is satisfied, then the smart sensor can generate a notification that the pair of image sensors is outputting invalid data. The notification can identify that at least one of the image sensors has been compromised or otherwise been tampered with. The notification can be sent to the data processing system. The data processing system can then perform at least one action to address the invalid data, such as ignore data coming from the at least one image sensor to control the AV (e.g., make driving decisions), instruct the AVCS to strand the AV (e.g., pull over), etc.

In general, image sensor safety can be developed with pre-assumed image sensor operation types (e.g., use cases). Such pre-assumed image sensor operation types may not always be consistent with practical image sensor operation types (e.g., consumer-practical image sensor operation types). Since the hardware development cycle can take around 2-5 years and is generally ahead of system and software development, there is a potential risk that the finalized software or system is not consistent with the original operation type assumptions made during hardware design. For example, the hardware may be adaptively consumed with other vehicle platforms and/or different Operational Design Domains (e.g., a camera can help on ego localization when a laser or Global Position System (GPS) is not stable in driving scenes). The new image sensor operation types generated in such situations may be beyond the original image sensor operation type assumptions made during the original hardware development. Moreover, many system-level variations (e.g., system platform, operational design domain, dynamic driving tasks, minimum risk conditions, and software architecture) can occur during the image sensor operational life cycle, which can lead to continuous impact analysis and system mitigation patches. Accordingly, inconsistencies between the finalized software or system with the original operation type assumptions can negatively affect image sensor safety.

To address at least the above-noted drawbacks, aspects of the present disclosure provide a smart sensor that can further implement an adaptive impact analysis configuration solution for image sensor safety and fault detection. For example, the adaptive impact analysis configuration solution described herein can enhance a fault detection interface between the sensing system and the data processing system. It may be the case that a fault that is highly relevant for controlling the AV with respect to one image sensor operation type is not relevant for controlling the AV with respect to another image sensor operation type. In order to account for differences in fault relevancy (e.g., fault severity) with respect to different image sensor operation types, the data processing system can determine (e.g., generate) a number of impact analysis configurations each corresponding to a respective image sensor operation type. An impact analysis configuration can include a set of configuration settings for the image sensor operation type. Each configuration setting of the set of configuration settings can have a format for a configuration layer. Examples of configuration layers can include an image quality impact layer, an image sensor safety mechanism layer, etc. The data processing system can send each impact analysis configuration to a fault notification component during system power-up or initialization to filter out non-safety related faults and system-tolerant faults from the notification scope (e.g., error/warning flag). In some implementations, the fault notification component is included in the smart sensor. Accordingly, each configuration can be used by the fault notification component to control how to perform fault aggregation with respect to its corresponding image sensor operation type.

The fault notification component can receive faults generated by one or more fault detectors, and generate a fault notification by performing an impact analysis using an impact analysis configuration. In some implementations, the fault detectors are included in the smart sensor. The fault notification can include a fault summary or report. The fault summary can include an aggregation of any detected faults into a number of groups with dedicated fault severity levels for reporting, where the detected faults may be relevant to an image sensor operation type as indicated by the impact analysis configuration. The fault notification can be sent to the data processing system, which can perform one or more actions based on whether the fault notification indicates that the image data includes invalid data at least with respect to the image sensor operation type (e.g., an image sensor is compromised or otherwise tampered with). For example, if the fault notification indicates a high fault severity with respect to the image sensor operation type, then image data obtained from the image sensor can be deemed unsafe. The data processing system can then perform at least one action to address the invalid data, such as ignore data coming from at least one image sensor to control the AV (e.g., make driving decisions), instruct the AVCS to strand the AV (e.g., pull over), etc.

Aspects and implementations disclosed herein provide numerous advantages over existing technologies. For example, the implementations described herein can improve hardware security of AV sensors used within AV systems, provide quick feedback safety authentication, reduce latency in safety authentication, minimize impact analysis related design efforts, increase system confidence level with respect to using image sensor fault notification information, and minimize potential safe of intended function (SOTIF) risk. Therefore, implementations described herein can improve the security of data traffic to and from an AV sensor of an AV system.

FIG. 1 is a diagram illustrating components of an example autonomous vehicle (AV) 100, in accordance with some implementations of the present disclosure. FIG. 1 illustrates operations of the example autonomous vehicle.

Autonomous vehicles can include passenger and commercial motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each defined different levels of automated driving to indicate how much, or how little, a vehicle controls the driving, although different organizations may categorize the levels differently.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. The disclosed techniques can be used in Level 3 driving assistance systems capable of autonomous driving under limited (e.g., highway) conditions. Likewise, the disclosed techniques can be used in vehicles that use Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems.

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the driving environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. The data processing system 120 can further include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the driving environment 101 and velocities (radial and, in some implementations, transverse, as described below) of such objects. In some implementations, the perception system 130 can use radar data in combination with the data captured by the camera(s) 118, as described in more detail below.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, (e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include a driving environment monitoring and prediction component 126, which can monitor how the driving environment 101 evolves with time, e.g., by keeping track of the locations and velocities of the animated objects (e.g., relative to Earth). In some implementations, the driving environment monitoring and prediction component 126 can keep track of the changing appearance of the driving environment due to a motion of the AV relative to the driving environment. In some implementations, the driving environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the driving environment monitoring and prediction component 126 can conclude that object 1 is resuming its motion from a stop sign or a red traffic light signal. Accordingly, the driving environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the driving environment monitoring and prediction component 126 can conclude that object 2 is stopping at a stop sign or at a red traffic light signal. Accordingly, the driving environment monitoring and prediction component 126 can predict where object 2 is likely to be within the next 1 or 3 seconds. The driving environment monitoring and prediction component 126 can perform periodic checks of the accuracy of its predictions and modify the predictions based on new data obtained from the sensing system 110. The driving environment monitoring and prediction component 126 can operate in conjunction with default corridor component 132.

The data generated by the perception system 130, the GPS data processing module 122, and the driving environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, radar 114, and/or lidar 112 can determine that the path ahead (e.g., a current driving lane) is hindered by one or more road primitives (e.g., cones or traffic signs). The AVCS 140 can cause the AV 100 to alter a driving path (e.g., change lanes) based on the detected one or more road primitives (e.g., identifying a spatial relationship between the road primitives, detecting displayed navigational instructions associated with the road primitives). As will be described in further detail below with reference to FIG. 2, the data processing system 120 can determine the status of a lane (e.g., temporary lane closure) based on the detection of the one or more road primitives. The AVCS 140 can then output instructions to powertrain, brakes and steering 150 to route the AV through a temporary travel path (e.g., a detour) and return the AV to an original driving path after determining the status of the associated lane has returned to a previous state (e.g., a normal or active lane state). Based on this determination, the AVCS 140 can output instructions to the powertrain, brakes and steering 150 to drive around the candidate object. The data processing system 120 may provide data used to predict the behavior of objects (e.g., vehicles, pedestrians, etc.) in the driving environment of the AV. The AVCS 140 may alter driving behavior of the AV responsive to data indicating future states of objects within the driving environments. The data processing system 120 may detect a construction zone and detect that an oncoming lane shifts or merges into the current lane of the AV. The data processing system 120 may communicate to the AV to choose to yield or nudge accordingly based on the object detection (e.g., oncoming vehicles). For example, the data processing system 120 may determine that a two-way road with two lanes in each direction has a construction zone in which the oncoming traffic lanes are closed and one of the lanes of traffic in the direction of the AV's motion is provided for the oncoming traffic. Data processing system 120 can determine that the left lane currently occupied by the AV is to be used by the oncoming traffic within a certain driving distance. Using the output of the data processing system 120, the AVCS 140 can alter a driving path of the AV by causing the AV to move to the right lane.

The sensing system 110 can further include one or more image sensors 115. Each of the image sensors 115 is operatively coupled to a respective image capturing device (e.g., a respective one of the cameras 118). For example, each of the image sensors 115 can be included in its respective image capturing device. Each of the image sensors 115 can cover a set of regions of interest (ROIs). In some implementations, each of the image sensors 115 can include at least 3 ROIs. Alternatively, other numbers of ROIs can be used.

The AV 100 can further include a smart sensor 125. In some implementations, and as shown in FIG. 1, the smart sensor 125 can be included within the data processing system 120. In alternative implementations, the smart sensor 125 is included within the sensing system 110. The smart sensor 125 can receive image data from at least one of the image sensors 115.

At least one of the image sensors 115 may generate image data that indicates one or more faults due to one or more failures (e.g., a hardware failure and/or a software failure), which can lead to a corrupted image sensor output to the data processing system 120. Examples of a corrupted image sensor output include poor image color, blurred image, excessive image noise, loss of image, etc. To address such issues, as further shown, AV 100 can include one or more fault detectors 127 and a fault notification component 129. In some implementations, and as shown, the fault detectors 127 and the fault notification component 129 are included in the smart sensor 125. In some implementations, the fault detectors 127 and/or the fault notification component 129 are standalone components (e.g., of the data processing system 120). In some implementations, the fault detectors 127 and/or the fault notification component 129 are included in the sensing system 110.

The fault detectors 127 can include one or more internal monitors that detect faults with respect to the sensing system 110 that may be reflected in image data obtained by the image sensors 115 of the sensing system 110. Examples of faults that can be detected by the fault detectors 127 include high temperature faults, processor error or corruption faults, exposure faults, etc. Regarding high temperature faults, the fault detectors 127 can include a temperature monitor to monitor a local temperature of the sensing system (e.g., of various components of the sensing system 110), and detect a high temperature fault if the local temperature (e.g., of any component of the sensing system 110) is higher than a predetermined threshold. Regarding processor error faults, the fault detectors 127 can implement a dual lock step to run a same set of operations on redundant processing unit (e.g., central processing unit (CPU)) processes with one clock bit offset to generate respective outputs, and compare the outputs to determine if there is a processor error fault. Regarding exposure faults, the fault detectors 127 can include an exposure monitor to collect historical image pixel intensity associated with an image across a period of time, and compare a distribution of the image pixel intensity (e.g., a histogram distribution) with ambient light sensor data to determine whether the image is overexposed or underexposed due to a camera exposure fault.

The smart sensor 125 can be used to implement AV sensor security, authentication and safety. For example, the smart sensor 125, in conjunction with the image sensors 115 and data processing system 120, can be used to prevent or eliminate the risk of security incidents during AV operation. In some implementations, the AV 100 is a multitenant AV (e.g., multitenant public transportation vehicle or multitenant taxi). Thus, the smart sensor 125 can be used to implement a sensor security, authentication and safety system for use within a multitenant AV.

As will be described in further detail below with reference to FIGS. 2-3 and 5, the smart sensor 125 can include an integrated circuit that can implement an image sensor data stream safety authentication mode ("safety authentication mode"). For example, the image sensors 115 can include a pair of image sensors, with each image sensor being operatively coupled to (e.g., included within) a respective image capturing device (e.g., camera 118). Each image sensor can cover image data of a respective set of regions of interest (ROIs). In some implementations, each set of ROIs includes at least 3 ROIs. Alternatively, other numbers of ROIs can be used.

Image data can correspond to a number of frames. For example, a given frame can have multiple images—e.g., an image obtained by a first image capturing device at a particular point in time and an image obtained by a second image capturing device at the same point in time. Each image sensor can divide an image into multiple ROIs that each correspond to a portion of a field of view of the image capturing device. In some implementations, the image data includes image metadata. Examples of image metadata include pixel statistical information for each ROI (e.g., histogram data, mean, standard deviation median and mode), exposure time, image size, gain settings, security features, etc.

The smart sensor 125 can then, for a given frame, compare respective image data of different image sensors based on individual ROIs. For example, two ROIs of two different image sensors can correspond to the same portion of the field of view. The correspondence between the ROIs of the different sensors can be determined based on the type of image data (e.g., image metadata) being compared. Based on the comparison, the smart sensor 125 can determine whether an amount of image data matching between the two image sensors with respect to the corresponding ROIs indicates that the sensing system has been compromised. Illustratively, in the case that the image data is histogram data, the histogram data for a first ROI of a first image sensor can be compared to the histogram data for a second ROI of a second image sensor, where the first and second ROIs are directly adjacent (e.g., centrally located).

The smart sensor 125 can determine whether the amount of image data matching is insufficient by determining whether the amount of image data matching satisfies a threshold condition. For example, determining whether the amount of image data matching satisfies the threshold condition can include determining whether the amount of image data matching (e.g., difference between the image data) is below a threshold amount of matching (e.g., a threshold difference). If not (e.g., it is equal to or above the threshold amount), then the sensing system 110 is determined to be outputting valid image data and there is no evidence of compromise (e.g., tampering or corruption). Otherwise, the pair of image sensors (e.g., at least one image sensor of the pair of image sensors) is determined to be outputting invalid image data and there is evidence of compromise.

It may be the case that a frame is determined to be invalid even if the corresponding image capturing device and/or image sensors have not been compromised (e.g., tampered with). That is, there is the possibility of obtaining a false positive result for a particular frame. To filter out false positive results and improve reliability and accuracy, the comparison can be performed until a number of consecutive frames that have an insufficient amount of image data matching satisfies a second threshold condition (e.g., the number of consecutive frames is equal to or greater than a threshold number of consecutive frames). If the second threshold condition is satisfied, then the smart sensor can generate a notification that the pair of image sensors is outputting invalid data. The threshold number of consecutive frames can be at least 1. For example, if the threshold number of consecutive frames is 1, this means that the image data can be declared invalid if a single frame satisfies the second threshold condition. As another example, if the second threshold is set to 10 frames, then the image data can be declared invalid if 10 consecutive frames are declared invalid.

The smart sensor 125 can generate a notification that the pair of image sensors is outputting invalid data. The notification can identify that at least one of the image sensors has been compromised or otherwise been tampered with. The notification can be sent to the data processing system 120.

Additionally or alternatively, as will be described in further detail below with reference to FIGS. 4 and 5, the smart sensor 125 can include an integrated circuit to implement an adaptive impact analysis configuration solution for image sensor safety and fault detection. In some implementations, the data processing system 120 generates a set of impact analysis configurations. Each impact analysis configuration of the set of impact analysis configurations corresponds to a respective image sensor operation type (e.g., use case). The data processing system 120 can send the set of impact analysis configurations to the fault notification component 129 during system power-up or initialization to filter out non-safety related faults and system-tolerant faults from the notification scope (e.g., error/warning flag). For example, an impact analysis configuration can include a set of configuration settings for the image sensor operation type. Each configuration setting of the set of configuration settings has a format for a configuration layer. A configuration layer may correspond to a particular image sensor functionality. Examples of configuration layers may include an image quality impact layer, an image sensor safety mechanism layer, etc. The data processing system 120 can send each impact analysis configuration to the fault notification component 129. Accordingly, each configuration can be used by the fault notification component 129 to control how to perform fault aggregation with respect to its corresponding image sensor operation type.

An impact analysis configuration can be used to determine whether image data includes invalid data, at least with respect to a particular image sensor operation type. One example of an image sensor operation type is a traffic light specific image sensor operation type. Another example of an image sensor operation type is an object detection specific image sensor operation type.

For example, the fault notification component 129 can receive a number of fault detection results from the fault detectors 127, and generate a fault notification related to the image sensor operation type by performing impact analysis using the impact analysis configuration. Impact analysis can be performed to evaluate a delta associated with an image sensor operation type, and can contribute to safety design change or system-level compensation to minimize impact resulting from the delta. The term "delta" refers to a difference between an original image sensor operation type assumption made during an image sensor development phase, and an updated or adapted image sensor operation type in a host architecture (and related sensor safety goals and/or requirements impact).

In some implementations, generating the fault notification can include aggregating the fault detection results to obtain a fault aggregation, and generating the fault notification using the fault aggregation. Aggregating the fault detection results can include dividing the fault detection results into a number of groups with dedicated fault severity levels. For example, a fault severity level can be determined and assigned to a group based on a mapping of the set of faults to minimum risk conditions. The fault notification component 129 can be fully accessible by the data processing system 120 using any suitable coding standard and/or verification tools. Based on the fault notification, the data processing system 120 can determine whether the received image includes valid data that can be used to control the AV.

The following is an example format of a configuration setting with respect to an image quality impact layer:
   Image Color, Level high
   Image Noise, Level low
   Image Intensity, Level medium
   Image FOV, Level high This example configuration setting format includes a set of image criteria (e.g., image color, image noise, image intensity, image FOV (field-of-view), and a level for each criterion of the set of image criteria indicating the corresponding importance of the criterion for the data processing component to control the autonomous vehicle with respect to the image sensor operation type (e.g., low level, medium level, high level). This example configuration setting format can pertain to a traffic light specific image sensor operation type, as decisions made by the data processing system 120 to control the AV with respect to the traffic light specific image sensor operation type are highly sensitive to incorrect image color. In contrast to the traffic light specific image sensor operation type, decisions made by the data processing system 120 to control the AV with respect to an object detection specific image sensor operation type are less sensitive to image color. Thus, in the object detection specific image sensor operation type, the image color criterion can be set to a lower level (e.g., low). Accordingly, a set of image faults can be assigned varying importance levels in accordance with image sensor operation type relevance for controlling the AV.

The following is an example format of a configuration setting with respect to an image sensor safety mechanism layer:
   Dual lock step, Report, N/A
   Memory monitor, Report, N/A
   BIST, Report, N/A
   Temperature monitor, Report, Threshold: 100

As shown in this image sensor operation type example, the configuration setting for the image sensor safety mechanism layer includes a set of fault detectors (e.g., dual lock step, memory monitor, BIST (built-in self-test), and temperature monitor). "Report" means to include a detected fault from the corresponding fault detection mechanism into the fault summary reported to the data processing component. The term "N/A" indicates that a corresponding fault detection threshold used by a corresponding monitor should not be adjusted. In this illustrative example, the configuration setting for the temperature monitor causes an adjustment of a temperature threshold used by the temperature monitor to determine a high temperature fault to 100 (e.g., 100 degrees Celsius). The threshold adjustments within a configuration setting can be related to the process latency of the data processing system 120.

In some implementations, the fault notification component 129 generates a fault notification in response to detecting at least one fault. In some implementations, the fault notification component 129 generates a fault notification after every fault detection (e.g., if zero faults are detected). The fault notification component 129 can send the fault notification to the data processing system 120.

The fault detection process can provide conclusive fault detection results. In some cases, a fault detection result can be a false positive result or a false negative result. A false positive result is a fault that is detected, but is considered benign in that it does not impact AV performance at least with respect to the image sensor operation type. A false negative result is a fault that is present, but is an undetected fault that was not detected by the fault detection components 127. Other fault detection methods may be used to handle undetected fault situations.

In response to receiving a notification indicating that the sensing system 110 is outputting invalid data (e.g., the notification generated during the safety authentication mode or the fault notification), the data processing system 120 can identify the sensing system 110 as a compromised sensing system, and perform at least one action to address the compromised sensing system.

In some implementations, performing the at least one action includes ignoring data output by at least one of the image sensors 115 for controlling the AV 100. For example, in response to receiving a notification generated during the safety authentication mode, image data output by the pair of image sensors can be ignored. As another example, in response to receiving a fault notification, image data output by at least one of the image sensors 115 can be ignored at least with respect to the image sensor operation type. Additionally or alternatively, the data processing system 120 can instruct the AVCS 140 to change driving behavior. For example, if the image sensors 115 outputting invalid data are more critical for operation of the AV 100 (e.g., front-facing image sensors), then the data processing system 120 can instruct the AVCS 140 to cause the AV 100 to pull over and stop. As another example, for less critical image sensors (e.g., side-facing image sensors), the data processing system 120 can allow the AV 100 to continue operating at a reduced speed and/or can cause the AV 100 to drive to a safe place (e.g., the home or garage of the AV owner).

Figure 2:
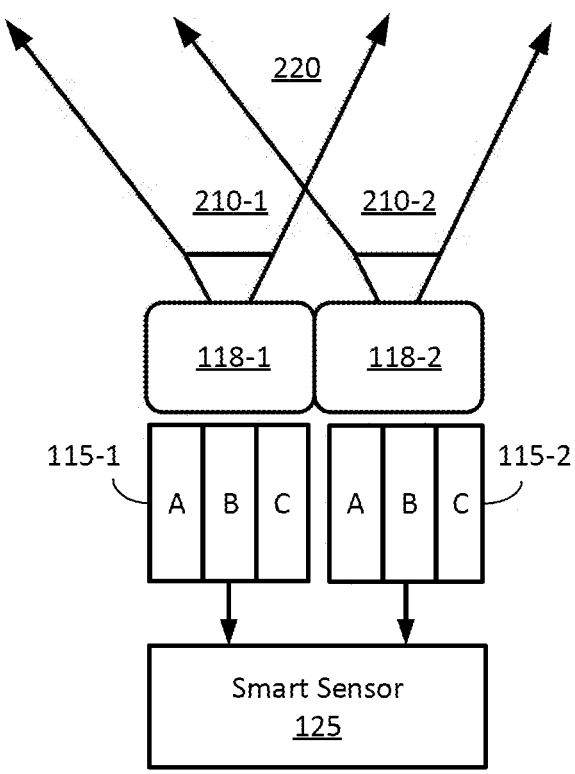
FIG. 2 is a diagram illustrating a system for implementing an image sensor data stream safety authentication mode, in accordance with some implementations of the present disclosure.

FIG. 2 is a diagram illustrating a system 200 for implementing an image sensor data stream safety authentication mode, in accordance with some implementations of the present disclosure. As shown, the system includes a pair of cameras 118-1 and 118-2, a pair of image sensors 115-1 and 115-1 operatively coupled (e.g., included within) respective ones of the pair of cameras 118-1 and 118-2, and a smart sensor 125 as described above with reference to FIG. 1. Although cameras are shown in FIG. 2, any suitable image capturing device can be used in accordance with implementations described herein.

The cameras 118-1 and 118-2 are pointing in substantially the same direction, and can have at least about 15 degrees of field of view overlap. Each of the cameras 118-1 and 118-2 has a corresponding image data capture region (e.g., cone) 210-1 and 210-2, respectively. An overlapping region 220 is defined by the overlap of portions of the image data capture regions 210-1 and 210-2. The placement of the cameras 118-1 and 118-2 in relation to one another is what defines the image data capture regions 210-1 and 210-2, and thus the overlapping region 220.

Each of the image sensors 115-1 and 115-2 can output image data based on data from its respective camera 118-1 and 118-2. The image data can include pixel data arranged based on predefined pixel array areas, where each pixel array area corresponds to a respective portion of the image data capture region. For example, as shown, each of the image sensors 115-1 and 115-2 can output pixel data into three regions of interest (ROIs) "A," "B" and "C." Each of the ROIs A, B, C associated with the image sensor 115-1 defines a respective portion of the image data capture region 210-1, and each of the ROIs A, B, C associated with the image sensor 115-2 defines a respective portion of the image data capture region 210-2. In some embodiments, the image data includes image metadata assigned to each frame with respect to the ROIs. For example, the image metadata data can include at least one of pixel statistic data (e.g., pixel histogram, pixel mean, pixel standard deviation, pixel median, pixel mode, etc.), exposure time, image size, gain settings, security features, etc.

In some implementations, the image sensors 115-1 and 115-2 are high dynamic range (HDR) image sensors. The HDR technique enables an increase in the dynamic range of captured images beyond the native capability of the image capturing devices. For example, HDR can include capturing multiple frames of the same scene but with different exposures, and then combining or fusing them into one, resulting in a dynamic range higher than those of individually captured frames.

As described above with reference to FIG. 1, image data output by the image sensors 115-1 and 115-2 can be received by the smart sensor 125 (or the data processing system 120 of FIG. 1). To determine image data validity (e.g., compromise or tampering), the smart sensor 125 can compare the image data for a plurality of ROIs (e.g., at least one of the ROIs A, B or C of image sensor 115-1 and at least one of the ROIs A, B or C of the image sensor 115-2) to determine, for each frame, an amount of image data matching between the image data. The smart sensor 125 can then determine whether the amount of image data matching for each frame is insufficient to indicate that the frame is valid. For example, a threshold can be set that defines an amount of matching between the pixel data and the predefined overlapping image area, which if not exceeded, would to declare the frame invalid. In an illustrative example, assume that the image data is histogram data. The smart sensor 125 can compare the histogram data of ROI C of image sensor 115-1, and the histogram data of ROI A of the image sensor 114-2. If a frame has an amount of image data matching that satisfies the threshold condition (e.g., is below a threshold value), then the frame is considered to be invalid. Otherwise, the frame is considered to be valid. As described above with reference to FIG. 1, to filter out false positive results and improve reliability and accuracy, the comparison can be performed until a number of consecutive frames that have an insufficient amount of image data matching satisfies a second threshold condition (e.g., the number of consecutive frames exceed a threshold number of consecutive frames). If the amount of image data matching is not sufficient, then the smart sensor 125 can generate a notification that the sensing system is outputting invalid data (e.g., at least one of the image capturing devices 118-1 or 118-2 and/or at least one of the image sensors 115-1 or 115-2 has been compromised). The smart sensor 125 can send the notification to the data processing system 120 to perform at least one action to address the invalid data, as described above with reference to FIG. 1.

Figure 3:
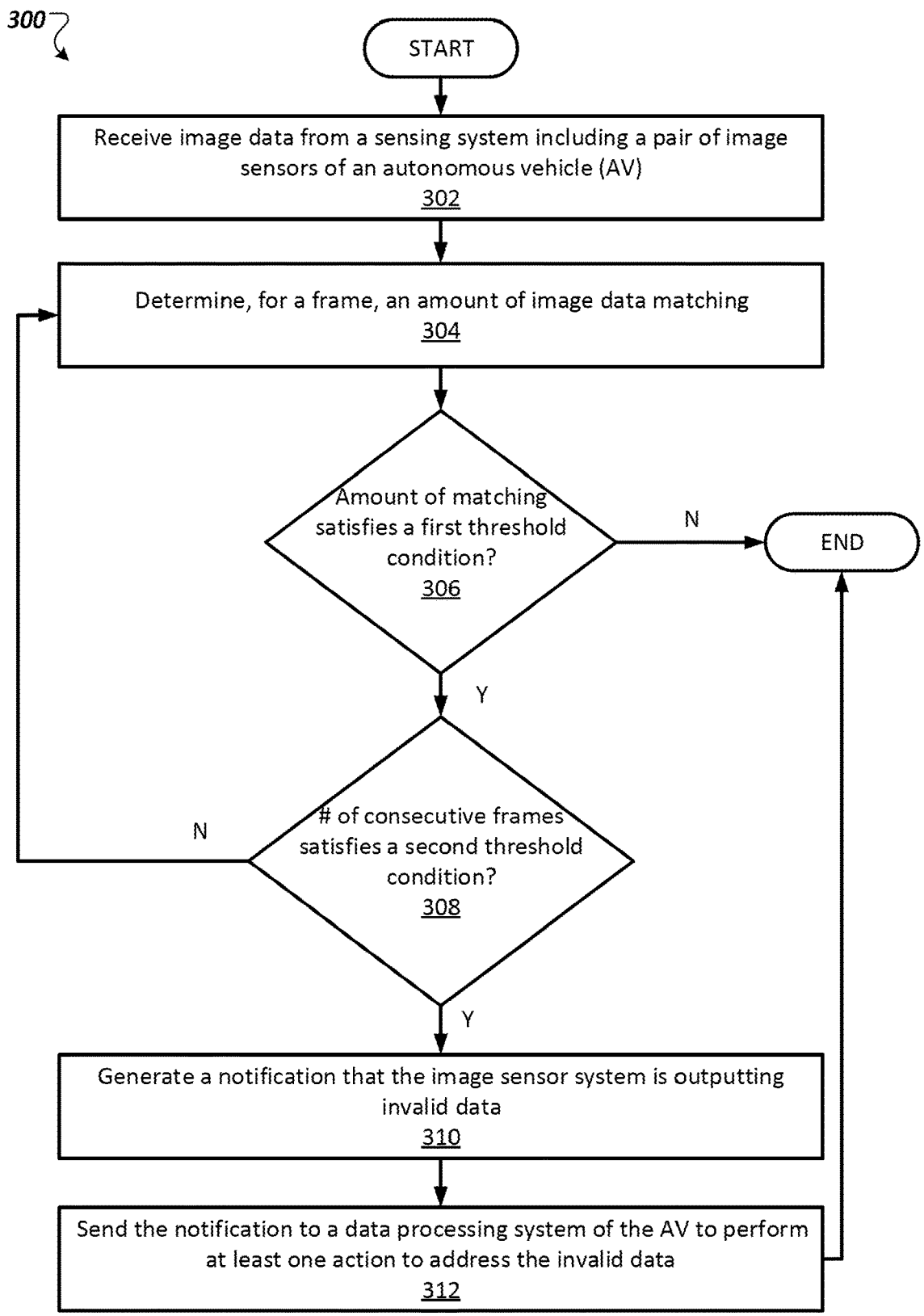
FIG. 3 is a flow diagram illustrating an example method for implementing an image sensor data stream safety authentication mode, in accordance with some implementations of the present disclosure.

FIG. 3 is a flow diagram illustrating an example method 300 for implementing an image sensor data stream safety authentication mode, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 300 and/or each of its individual functions, routines, subroutines, or operations. The processing device executing method 300 can perform instructions issued by various components, e.g., sensor component 125. For example, the method 300 can be performed by the smart sensor 125 of FIGS. 1-2. Method 300 can be used to improve AV sensor security, authentication and safety. In certain implementations, a single processing thread can perform method 300. Alternatively, two or more processing threads can perform method 300, each thread executing one or more individual functions, routines, subroutines, or operations of the methods. In an illustrative example, the processing threads implementing method 300 can be synchronized (e.g., using semaphores, critical sections, and/or other thread synchronization mechanisms). Alternatively, the processing threads implementing method 300 can be executed asynchronously with respect to each other. Various operations of method 300 can be performed in a different order compared with the order shown in FIG. 3. Some operations of method 300 can be performed concurrently with other operations. Some operations can be optional.

At operation 302, processing logic receives image data from a sensing system including a pair of image sensors of an autonomous vehicle (AV). Each image sensor of the pair of image sensors can be operatively coupled to a respective image capturing device (e.g., camera). The image capturing devices can be physically configured or arranged to point toward a substantially similar direction. The image data can be arranged in pixel array areas, where each pixel array area corresponds to a respective portion of the image data capture region. For example, each image sensor can include a respective set of regions of interest (ROIs). In some implementations, each set of ROIs includes at least 3 ROIs. However, the number of ROIs should not be considered limiting. In some embodiments, the pair of image sensors include high dynamic range (HDR) image sensors. Each image sensor can assign image data to a number of frames. In some implementations, the image data includes image metadata. Examples of image metadata include pixel statistical information for each ROI (e.g., histogram data, mean, standard deviation median and mode), exposure time, image size, gain settings, security features, etc.

At operation 304, the processing logic determines, for a frame, an amount of image data matching for a plurality of ROIs. Determining the amount of image data matching can include comparing the image data assigned to the frame with respect to a plurality of ROIs selected from the sets of ROIs. The plurality of ROIs can be selected from the sets of ROIs. For example, the plurality of ROIs can include at least one ROI from each set of ROIs. The ROIs can be selected based on the type of image data (e.g., image metadata) being compared. Illustratively, in the case that the image data is histogram data, the histogram data for a first ROI of a first image sensor can be compared to the histogram data for a second ROI of a second image sensor, where the first and second ROIs are directly adjacent (e.g., centrally located).

At operation 306, the processing logic determines whether the amount of image data matching satisfies a first threshold condition. For example, determining whether the amount of image data matching satisfies the threshold condition can include determining whether the amount of image data matching (e.g., difference between the image data) is below a threshold amount of matching (e.g., a threshold difference). If a frame has an amount of matching less than the threshold amount of matching, then the frame is determined to be invalid. Otherwise, the frame is determined to be valid and the process ends.

To filter out false positive results and improve reliability and accuracy, at operation 308, it is determined if the number of consecutive frames determined to be invalid satisfies a second threshold condition. For example, the second threshold condition can define a threshold number of consecutive frames determined to be invalid before declaring the image data invalid and the corresponding sensing system compromised (e.g., tampered with). The threshold number of consecutive frames can be at least 1. For example, if the threshold number of consecutive frames is 1, this means that the image data can be declared invalid if a single frame satisfies the second threshold condition. As another example, if the second threshold is set to 10 frames, then the image data can be declared invalid if 10 consecutive frames are declared invalid.

If the number of consecutive frames determined to invalid does not satisfy the second threshold condition (e.g., less than the threshold number of consecutive frames determined to be invalid), then the process can revert back to operation 304 to determine, for a next frame, an amount of matching between an observed overlapping region and an expected overlapping region. If the next frame is determined to have a sufficient amount of matching at operation 306, then the previous result of the previous frame may have been a false positive.

Otherwise, if the number of consecutive frames determined to be invalid satisfies the second threshold condition (e.g., equal to or greater than the threshold number of consecutive frames determined to be invalid), at operation 310, the processing logic generates a notification that the sensing system is outputting invalid data. For example, the notification can indicate that at least one image sensor of the pair of image sensors can be outputting invalid data. This can indicate that the sensing system (e.g., at least one image sensor of the pair of image sensors) has been compromised (e.g., tampered with).

At operation 312, the processing logic sends the notification to a data processing system of the AV to perform at least one action to address the invalid data. Further details regarding operations 302-312 are described above with reference to FIGS. 1-2 and below with reference to FIG. 5.

Figure 4:
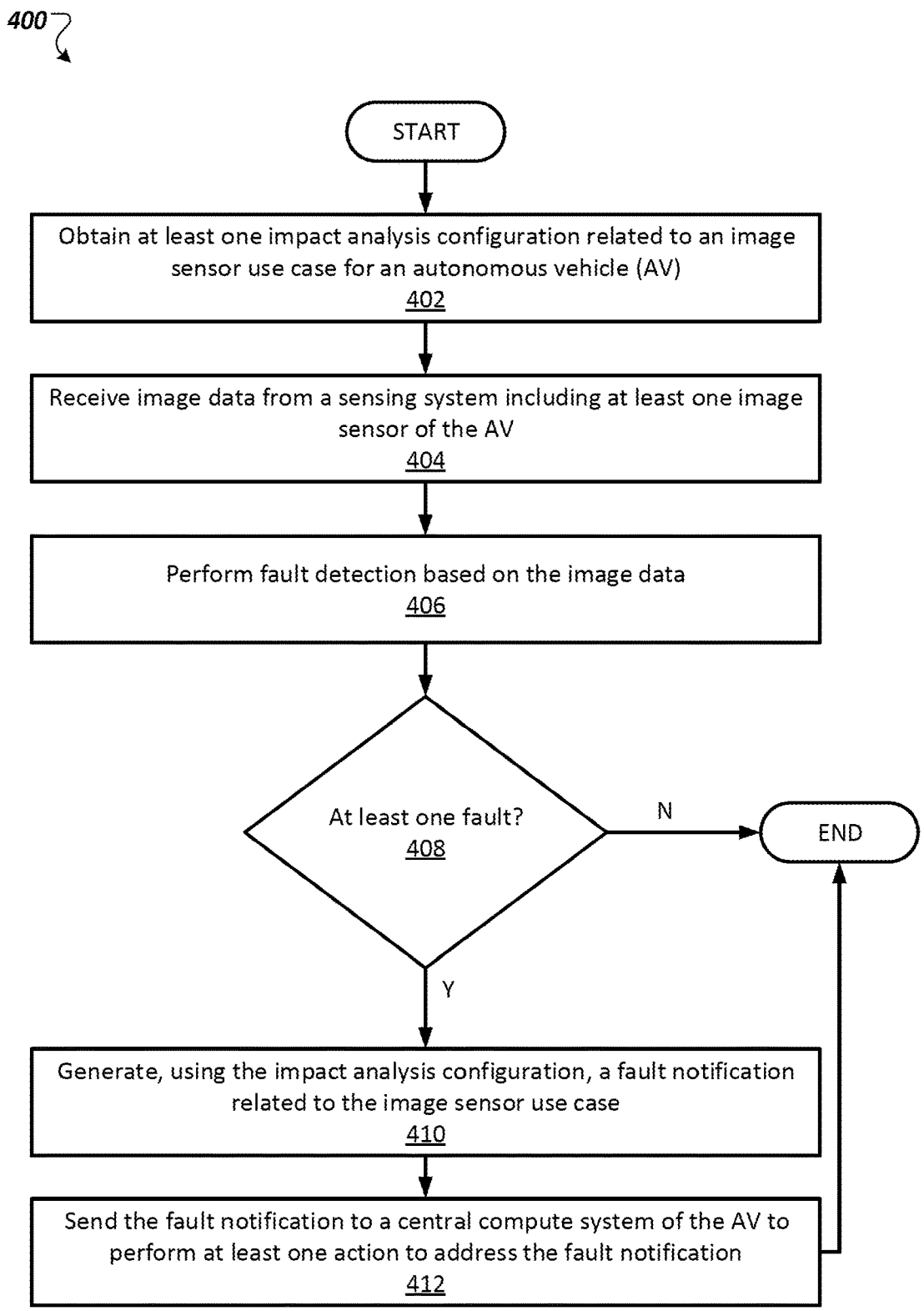
FIG. 4 is a flow diagram illustrating an example method for implementing an adaptive impact analysis configuration solution for image sensor safety and fault detection, in accordance with some implementations of the present disclosure.

FIG. 4 is a flow diagram illustrating an example method 400 for implementing an adaptive impact analysis configuration solution for image sensor safety and fault detection, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 400 and/or each of its individual functions, routines, subroutines, or operations. The processing device executing method 400 can perform instructions issued by various components, e.g., sensor component 125. Method 400 can be directed to systems and components of an autonomous driving vehicle, such as the autonomous vehicle 100 of FIG. 1. Method 400 can be used to improve AV sensor security, authentication and safety. In certain implementations, a single processing thread can perform method 400. Alternatively, two or more processing threads can perform method 400, each thread executing one or more individual functions, routines, subroutines, or operations of the methods. In an illustrative example, the processing threads implementing method 400 can be synchronized (e.g., using semaphores, critical sections, and/or other thread synchronization mechanisms). Alternatively, the processing threads implementing method 400 can be executed asynchronously with respect to each other. Various operations of method 400 can be performed in a different order compared with the order shown in FIG. 4. Some operations of method 400 can be performed concurrently with other operations. Some operations can be optional.

At operation 402, processing logic obtains at least one impact analysis configuration related to an image sensor operation type (e.g., use case) for an autonomous vehicle (AV). For example, obtaining the impact analysis configuration can include receiving the at least one impact analysis configuration from a data processing system of the AV. The impact analysis configuration can include a set of fault detection configuration settings related to the image sensor operation type. One example of an image sensor operation type is a traffic light specific image sensor operation type. Another example of an image sensor operation type is an object detection specific image sensor operation type.

The impact analysis configuration can be included in a set of impact analysis configurations each corresponding to a respective image sensor operation type. Each impact analysis configuration can be used to account for differences in fault relevancy (e.g., fault severity) with respect to each of the image sensor operation types. An impact analysis configuration can include a set of configuration settings for the image sensor operation type, with each configuration setting having a format corresponding to a configuration layer. Examples of configuration layers include an image quality impact layer, an image sensor safety mechanism layer, etc. The data processing system can send each impact analysis configuration during system power-up or initialization to filter out non-safety related faults and system-tolerant faults from the notification scope (e.g., error/warning flag). Accordingly, each impact analysis configuration can be used to control how to perform fault detection and notification with respect to the corresponding image sensor operation type.

At operation 404, the processing logic receives image data from a sensing system including at least one image sensor of the AV and, at operation 406, the processing logic performs fault detection by performing impact analysis based on the image data. For example, the processing logic can cause at least one fault detector of the AV to perform the fault detection based on the image data. The at least one fault detector can include an internal monitor that detects faults with respect to the image data.

At operation 408, the processing logic determines whether at least one fault is detected. For example, the at least one image sensor may generate at least one fault due to at least one failure. The at least one failure can include a hardware failure and/or a software failure. The at least one fault can lead to a corrupted image sensor output to the data processing system. Examples of a corrupted image sensor output include poor image color, blurred image, excessive image noise, loss of image, etc. Examples of faults that can be detected by the at least one fault detector include high temperature, processor error or corruption, exposure fault, etc.

Regarding high temperature faults, the at least one fault detector can include a temperature monitor. The temperature monitor can detect a high temperature fault by monitoring a local temperature of the sensing system, and comparing the local temperature to a predetermined threshold temperature. For example, if the local temperature is higher than the predetermined threshold temperature, then a high temperature fault is detected.

Regarding processor error faults, the at least one fault detector can include a dual lock step. The dual lock step can detect a processor error fault by executing a same set of operations on redundant processing unit (e.g., central processing unit (CPU)) processes with one clock bit offset to generate respective execution outputs, and compare the execution outputs. The comparison can be used to determine if there is a processor error fault.

Regarding exposure faults, the at least one fault detector can include an exposure monitor. The exposure monitor can detect an exposure fault by collecting historical image pixel intensity associated with an image across a period of time, and comparing a distribution of the image pixel intensity with ambient light sensor data. The comparison can be used to determine whether the image is overexposed or underexposed. For example, the distribution can be a histogram distribution.

If no faults are detected at operation 408, then the process may end. However, if at least one fault is detected at operation 408, at operation 410, the processing logic generates, using the at least one impact analysis configuration, a fault notification related to the image sensor operation type. For example, the processing logic can cause a fault notification component to generate the fault notification. The fault notification can include a fault report or fault summary that includes detected faults relevant to the image sensor operation type as indicated by the impact analysis configuration. In some embodiments, the fault notification can be generated even if no faults are detected. That is, the fault notification can be automatically generated after performing the fault detection, regardless of the results.

If a plurality of faults is detected, generating the fault notification can include aggregating the plurality of faults to obtain a fault aggregation, and generating the fault summary based on the fault aggregation. Aggregating the plurality of faults can include dividing each fault of the plurality of faults into a respective group corresponding to a fault severity level. For example, a fault severity level can be determined and assigned to a group based on a mapping of the set of faults to minimum risk conditions.

At operation 412, the processing logic sends the fault notification to a data processing system of the AV to perform at least one action to address the fault notification. The at least one action can be selected based whether the fault notification indicates that the at least one image sensor is outputting invalid data with respect to the image sensor operation type (e.g., the sensing system is compromised).

For example, if the fault notification indicates a high fault severity with respect to the image sensor operation type, then image data obtained from the sensing system can be deemed invalid (e.g., unsafe). That is, the sensing system may be compromised (e.g., tampered with). The data processing system can then ignore image data obtained from the sensing system to control the AV (e.g., make driving decisions), at least with respect to the image sensor operation type.

Otherwise, if the fault notification does not indicate a high fault severity with respect to the image sensor operation type (e.g., a lower fault severity with respect to the image sensor operation type or there are no faults detected), the, the image data is deemed valid (e.g., safe). That is, the sensing system may not be compromised. The data processing system can continue utilizing the image data obtained from the sensing system to control the AV, at least with respect to the image sensor operation type. Further details regarding operations 402-412 are described above with reference to FIG. 1 and below with reference to FIG. 5.

Figure 5:
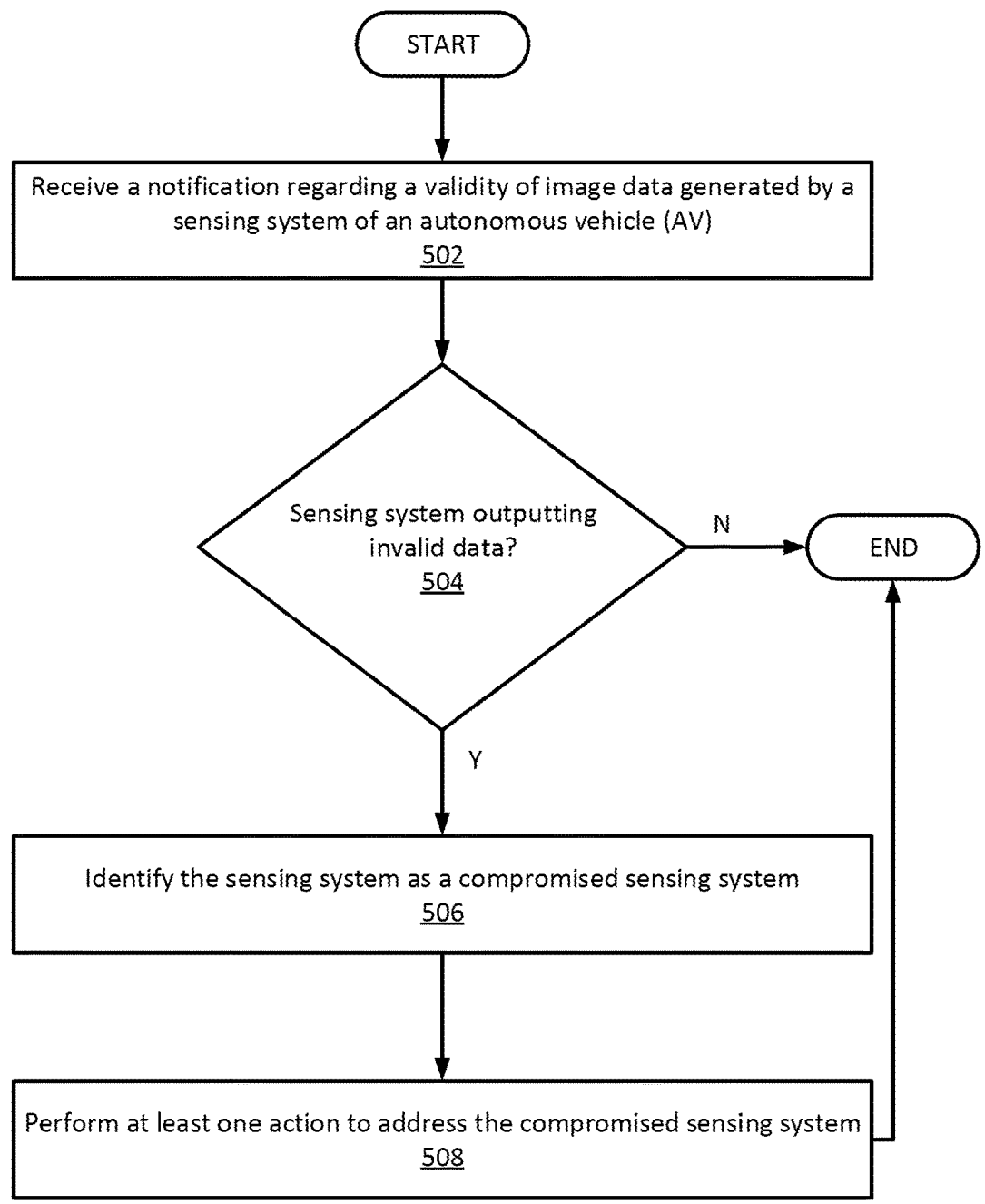
FIG. 5 is a flow diagram illustrating an example method for addressing a notification regarding image data, in accordance with some implementations of the present disclosure.

FIG. 5 is a flow diagram illustrating an example method 500 for addressing a notification regarding image data, in accordance with some implementations of the present disclosure. A processing device, having one or more processing units (CPUs), and or graphics processing units (GPU), telematics control units (TCUs), and memory devices communicatively coupled to the CPU(s) and/or GPUs, can perform method 500 and/or each of its individual functions, routines, subroutines, or operations. The processing device executing method 500 can perform instructions issued by e.g., data processing system 120. Method 500 can be used to improve AV sensor security, authentication and safety. In certain implementations, a single processing thread can perform method 500. Alternatively, two or more processing threads can perform method 500, each thread executing one or more individual functions, routines, subroutines, or operations of the methods. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Various operations of method 500 can be performed in a different order compared with the order shown in FIG. 5. Some operations of method 500 can be performed concurrently with other operations. Some operations can be optional.

At operation 502, processing logic receives a notification regarding a validity of image data generated by a sensing system of an autonomous vehicle (AV). The sensing system can include at least one image sensor. For example, the notification can be a notification regarding the validity of image data obtained from a pair of image sensors during a safety authentication mode, as described above with reference to FIGS. 1-3. As another example, the notification can be a fault notification regarding the validity of image data with respect to an image sensor operation type, as described above with reference to FIGS. 1 and 4.

At operation 504, the processing logic determines whether the notification indicates that the sensing system is outputting invalid data. For example, if the notification is a notification regarding the validity of image data obtained from a pair of image sensors during a safety authentication mode, then the notification can be generated based on an amount of matching being insufficient (as described above with reference to FIGS. 1-3). As another example (as described above with reference to FIGS. 1 and 4, if the notification is a fault notification regarding the validity of image data with respect to an image sensor operation type, then determining whether the notification indicates that the sensing system is outputting invalid data can include identifying, from the fault notification, a fault severity with respect to the image sensor operation type. If the fault severity is a high fault severity, then it is determined that the sensing system is outputting invalid data, at least with respect to the image sensor operation type.

If not, then this means that the sensing system is outputting valid data, and the process can end. However, if the notification indicates that the sensing system is outputting invalid data, at operation 506, the processing logic identifies the sensing system as a compromised sensing system and, at operation 508, the processing logic performs at least one action to address the compromised sensing system. In some implementations, performing the at least one action includes ignoring data output by at least one of the image sensors for controlling the AV. For example, in response to receiving a notification generated during the safety authentication mode, image data output by the pair of image sensors can be ignored. As another example, in response to receiving a fault notification, image data output by at least one of the image sensors can be ignored at least with respect to the image sensor operation type. Additionally or alternatively, the data processing system can instruct the AVCS to change driving behavior. For example, if the image sensors outputting invalid data are more critical for operation of the AV (e.g., front-facing image sensors), then the data processing system can instruct the AVCS to cause the AV to pull over and stop. As another example, for less critical image sensors (e.g., side-facing image sensors), the data processing system can allow the AV to continue operating at a reduced speed and/or can cause the AV to drive to a safe place (e.g., the home or garage of the AV owner). Further details regarding operations 502-506 are described above with reference to FIGS. 1-4.

Figure 6:
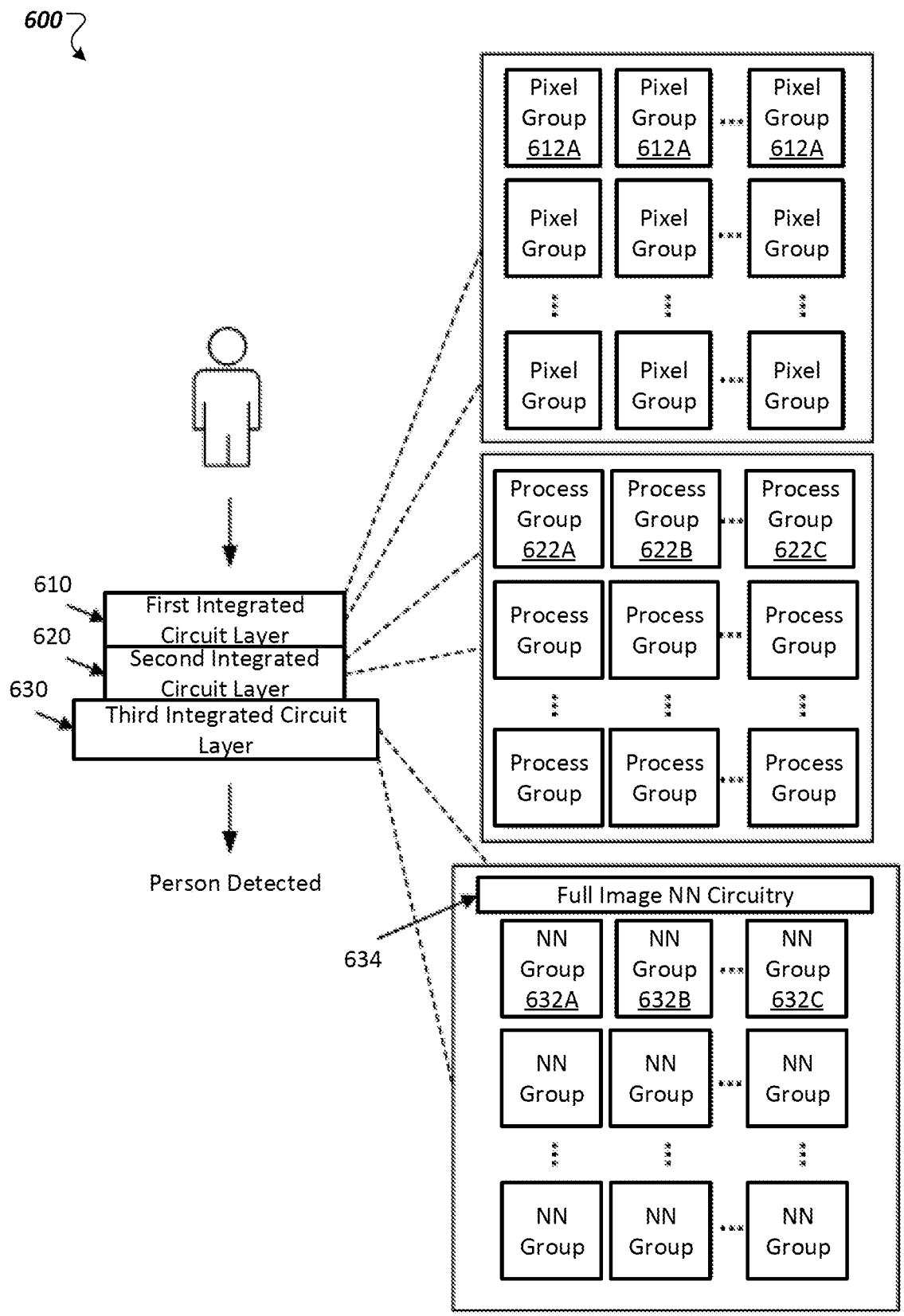
FIG. 6 is a block diagram of an image sensor with three integrated circuit layers, in accordance with some implementations of the present disclosure.

FIG. 6 is a block diagram of an image sensor 600 with three integrated circuit layers, in accordance with some implementations of the present disclosure. Image sensor 600 may use the three integrated circuit layers to detect objects. For example, image sensor 600 may capture an image that includes a person and output an indication of "person detected." In another example, image sensor 600 may capture an image and output a portion of the image that includes a vehicle that was detected by image sensor 600.

The integrated circuit layers include a first integrated circuit layer ("layer") 610, a second integrated circuit layer ("layer") 620, and a third integrated circuit layer ("layer") 630. Layer 610 is stacked on layer 620, and layer 620 is stacked on layer 630. Layer 610 may be in electrical communication with layer 620. For example, layer 610 and layer 620 may be physically connected to one another with interconnects. Layer 620 may be in electrical communication with layer 630. For example, layer 620 and layer 630 may be physically connected to one another with interconnects. Layer 610 may have a same area as layer 620. For example, the length and width of layer 610 and layer 620 may be the same while the heights may be different. Layer 630 may have a larger area than layers 610, 620. For example, layer 630 may have a length and width that are both twenty percent greater than the length and the width of layers 610, 620. In some embodiments, layers 610 and 620 are included in an image sensor (e.g., an image sensor 115 of FIG. 1) and the layer 630 is included in the smart sensor 125 and/or the data processing system 120.

Layer 610 may include an array of pixel sensors that are grouped by position into pixel groups ("pixel groups") including 612A-612C. For example, layer 610 may include a 6400×4800 array of pixel sensors grouped into 310×240 pixel groups, where each pixel group includes an array of 20×20 pixel sensors. Pixel groups may be further grouped to define regions of interest (ROIs).

Each of the pixel groups may include 2×2 pixel sensor sub-groups. For example, each of the pixel groups of 20×20 pixel sensors may include 10×10 pixel sub-groups, where each pixel sub-group includes a red pixel sensor in an upper left, a green pixel sensor in a lower right, a first clear pixel sensor in a lower left, and a second clear pixel sensor in an upper right, each pixel sub-group also referred to as Red-Clear-Clear-Green (RCCG) sub-groups.

In some implementations, the size of the pixel groups may be selected to increase silicon utilization. For example, the size of the pixel groups may be such that more of the silicon is covered by pixel groups within the same pattern of pixel sensors.

Second integrated circuit layer 620 may include image processing circuitry groups ("process groups") 622A-622C. For example, second integrated circuit layer 620 may include 322×240 process groups. The process groups may each be configured to receive pixel information from one or more of the pixel groups, and perform image processing operations on the pixel information to provide pixel information during operation of the image sensor 600.

In some implementations, each of the process groups may receive pixel information from a single corresponding one of the pixel groups. For example, process group 622A may receive pixel information from pixel group 612A and not from any other pixel group, process group 622B may receive pixel information from pixel group 612B and not from any other pixel group, etc.

In some implementations, each of the process groups may receive pixel information from multiple ones of the pixel groups. For example, process group 622A may receive pixel information from pixel groups 612A and 612B and not from any other pixel group, process group 622B may receive pixel information from pixel group 612C and some other pixel group (and not from any other pixel group), etc.

Having the process groups receive pixel information from corresponding pixel groups may result in fast transfer of the pixel information from layer 610 to layer 620 as the process groups may be physically close to the pixel groups. The longer the distance over which information is transferred, the longer the transfer may take. For example, pixel group 612A may be directly above process group 622A, so transferring pixel information from pixel group 612A to processing group 622A may be faster than transferring pixel information from pixel group 612A to process group 622C (if there were interconnects between pixel group 612A and process group 622C.

Each of the process groups may be configured to perform image processing operations on the pixel information received from the corresponding pixel group(s). For example, process group 622A may perform high dynamic range fusion on pixel information from pixel group 612A and process group 622B may perform high dynamic range fusion on pixel information from pixel group 612B. Other image processing operations may include, for example, analog to digital signal conversion and de-mosaicing.

Having the process groups perform image processing operations on the pixel information may enable image processing operations to be performed in a distributed fashion in parallel by the process groups. For example, process group 622A may perform image processing operations on pixel information from pixel group 612A at the same time as process group 622B performs image processing operations on pixel information from pixel group 622B.

Layer 630 may include neural network (NN) circuitry groups ("NN groups") including NN groups 632A-632C and full image NN circuitry 634. For example, layer 630 may include 322×240 NN groups. Each of the NN groups may be configured to receive processed pixel information from a corresponding process group, and analyze the processed pixel information for object detection during operation of the image sensor 600. In some implementations, each of the NN groups can implement a convolutional neural network (CNN).

In some implementations, each of the NN groups may receive processed pixel information from a single corresponding one of the process groups. For example, NN group 632A may receive processed pixel information from process group 622A and not from any other process group, NN group 632B may receive processed pixel information from process group 622B and not from any other process group, etc.

In some implementations, each of the NN groups may receive processed pixel information from multiple ones of the process groups. For example, NN group 632A may receive processed pixel information from process groups 622A and 622B and not from any other process group, NN group 632B may receive processed pixel information from process group 622C and some other process group (and not from any other pixel group), etc.

Having the NN groups receive processed pixel information from corresponding process group(s) may result in fast transfer of the processed pixel information from layer 620 to layer 630 as the NN groups may physically be close to the corresponding process groups. Again, the longer the distance over which information is transferred, the longer the transfer may take. For example, process group 622A may be directly above NN group 632A, so transferring processed pixel information from process group 622A to NN group 632A may be faster than transferring processed pixel information from process group 622A to NN group 632C, if there were interconnects between process group 622A and NN group 632C.

The NN groups may be configured to detect objects from the processed pixel information received from the corresponding process groups. For example, NN group 632A may detect objects from the processed pixel information received from process group 622A. Having the NN groups detect objects from the processed pixel information can enable detection to be performed in a distributed fashion in parallel by each of the NN groups 132. For example, NN group 632A may detect objects from processed pixel information received from process group 622A at the same time as NN group 632B may detect objects from processed pixel information from process group 622B.

In some implementations, the NN groups may perform intermediate processing. Accordingly, image sensor 600 may use the layers 610, 620, and 630 to perform some intermediate processing and output just an intermediate result. For example, image sensor 600 may capture an image that includes a person and output an indication of "area of interest in some region of the image," without classifying the object of interest (the person). Other processing, performed outside image sensor 600 may classify the region of interest as a person.

Accordingly, the output from image sensor 600 may include some data representing the output of some NN (e.g., CNN). This data in itself may be hard to decipher, but once it continues to be processed outside image sensor 600, the data may be used to classify the region as including a person. This hybrid approach may have an advantage of reducing required bandwidth. Accordingly, output from the NN groups may include one or more of selected regions of interest for pixels representing detections, metadata containing temporal and geometrical location information, intermediate computational results prior to object detection, statistical information regarding network certainty level, and classifications of detected objects. In some implementations, the NN groups may be configured to implement CNNs with high recall and low precisions. Each of the NN groups may output a list of detected objects, where each object was detected, and a timing of the detection of each object.

Full image NN circuitry 634 may be configured to receive, from each of NN groups, data that indicates objects that each of the NN groups detected and detect objects from the data. For example, the NN groups may be unable to detect an object that is captured by multiple pixel groups, as each individual NN group may only receive a portion of processed pixel information corresponding to the object. However, full image NN circuitry 634 may receive data from multiple NN groups and may thus be able to detect objects sensed by multiple pixel groups. In some implementations, full image NN circuitry 634 may implement a recurrent neural network (RNN). The NNs may be configurable, both in regard to their architecture (e.g., number and type of layers, activation functions) as well as in regard to the actual values of neural network components (e.g., weights, biases).

In some implementations, having image sensor 600 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

Figure 7:
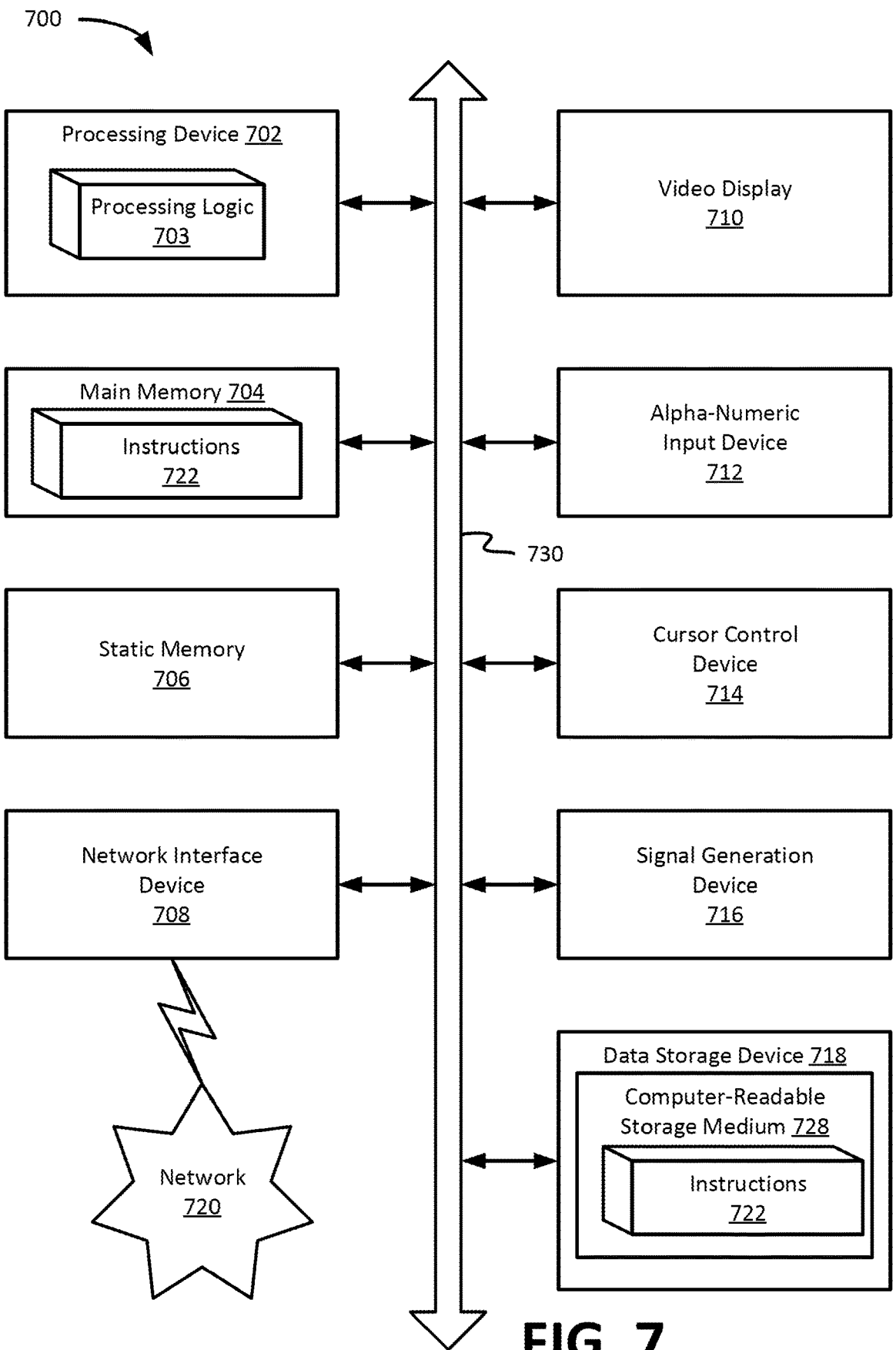
FIG. 7 is a block diagram of an example computer device within which a set of instructions, for causing the machine to perform any of the one or more methodologies discussed herein can be executed, in accordance with some implementations of the disclosure.

FIG. 7 depicts a block diagram of an example computer device 700 within which a set of instructions, for causing the machine to perform any of the one or more methodologies discussed herein can be executed, in accordance with some implementations of the disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the AV 100 includes the computer device 700.

The computer device 700 can include a processing device 702 (also referred to as a processor or CPU), which can include processing logic 703, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 702 can be configured to execute instructions performing any of the operations performed by the AV 100, sensor component 125, data processing system 120, etc.

Example computer device 700 can further comprise a network interface device 708, which can be communicatively coupled to a network 820. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the disclosure, executable instructions 722 can comprise executable instructions to perform any of the operations of AV 100, sensor component 125, data processing system 120, etc.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "obtaining," "sending," and "causing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation," "one implementation," "some implementations," "an implementation," "one implementation," "some implementations," or the like throughout may or may not mean the same implementation or implementation. One or more implementations or implementations described herein may be combined in a particular implementation or implementation. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    obtaining, by a processing device, an impact analysis configuration of a plurality of impact analysis configurations, wherein the impact analysis configuration is related to an image sensor operation type of a plurality of image sensor operation types for an autonomous vehicle (AV), the plurality of image sensor operation types comprising a traffic light specific image sensor operation type and an object detection specific image sensor operation type;
    receiving, by the processing device, image data from a sensing system including at least one image sensor of the AV;
    causing, by the processing device, fault detection to be performed based on the image data;
    causing, by the processing device, a fault notification to be generated using the impact analysis configuration, wherein the fault notification comprises a fault summary related to the image sensor operation type; and
    sending, by the processing device to a data processing system of the AV, the fault notification to perform at least one action to address the fault notification.

2. The method of claim 1, wherein obtaining the impact analysis configuration further comprises receiving the impact analysis configuration from the data processing system.

3. The method of claim 1, wherein the impact analysis configuration further comprises a set of configuration settings for the image sensor operation type, and wherein each configuration setting of the set of configuration settings has a format for a configuration layer.

4. The method of claim 1, wherein causing the fault detection to be performed further comprises:
    detecting a plurality of faults; and
    aggregating the plurality of faults to obtain a fault aggregation.

5. The method of claim 4, wherein causing the fault notification to be generated further comprises generating the fault notification using the fault aggregation.

6. The method of claim 4, wherein aggregating the plurality of faults further comprises dividing each fault of the plurality of faults into a respective group corresponding to a fault severity level.

7. The method of claim 1, wherein the fault detection is performed by a set of fault detectors comprising at least one of:
    a temperature monitor to detect temperature faults by monitoring a local temperature of the sensing system, and comparing the local temperature to a predetermined threshold temperature;
    a dual lock step to detect processor error faults by executing a same set of operations on redundant processing unit processes with one clock bit offset to generate respective execution outputs, and comparing the execution outputs; or an exposure monitor to collect historical image pixel intensity data associated with an image across a period of time, and compare a distribution of the historical image pixel intensity data with ambient light sensor data.

8. A system comprising:
a memory and
a hardware processing device, operatively coupled to the memory, to perform operations comprising:
obtaining an impact analysis configuration of a plurality of impact analysis configurations, wherein the impact analysis configuration is related to an image sensor operation type of a plurality of image sensor operation types for an autonomous vehicle (AV), the plurality of image sensor operation types comprising a traffic light specific image sensor operation type and an object detection specific image sensor operation type;
receiving image data from a sensing system including at least one image sensor of the AV;
causing fault detection to be performed based on the image data; causing a fault notification to be generated using the impact analysis
configuration, wherein the fault notification comprises a fault summary related to the image sensor operation type; and
sending, to a data processing system of the AV, the fault notification to perform at least one action to address the fault notification.

9. The system of claim 8, wherein obtaining the impact analysis configuration further comprises receiving the impact analysis configuration from the data processing system.

10. The system of claim 8, wherein the impact analysis configuration further comprises a set of configuration settings for the image sensor operation type, and wherein each configuration setting of the set of configuration settings has a format for a configuration layer.

11. The system of claim 8, wherein causing the fault detection to be performed further comprises:
detecting a plurality of faults; and
aggregating the plurality of faults to obtain a fault aggregation.

12. The system of claim 11, wherein causing the fault notification to be generated further comprises generating the fault notification using the fault aggregation.

13. The system of claim 11, wherein aggregating the plurality of faults further comprises dividing each fault of the plurality of faults into a respective group corresponding to a fault severity level.

14. The system of claim 8, wherein the fault detection is performed by a set of fault detectors comprising at least one of:
a temperature monitor to detect temperature faults by monitoring a local temperature of the sensing system, and comparing the local temperature to a predetermined threshold temperature;
a dual lock step to detect processor error faults by executing a same set of operations on redundant processing unit processes with one clock bit offset to generate respective execution outputs, and comparing the execution outputs; or
an exposure monitor to collect historical image pixel intensity data associated with an image across a period of time, and compare a distribution of the historical image pixel intensity data with ambient light sensor data.

15. A system comprising:
a sensing system of an autonomous vehicle (AV);
a data processing system of the AV;
a set of fault detectors comprising at least one of:
a temperature monitor to detect temperature faults;
a dual lock step to detect processor error faults; or
an exposure monitor to compare a distribution of image pixel intensity data with ambient light sensor data;
a memory; and
a hardware processing device, operatively coupled to the memory, to perform operations comprising:
obtaining an impact analysis configuration of a plurality of impact analysis configurations, wherein the impact analysis configuration is related to an image sensor operation type of a plurality of image sensor operation types for an autonomous vehicle (AV), the plurality of image sensor operation types comprising a traffic light specific image sensor operation type and an object detection specific image sensor operation type;
receiving image data from the sensing system including at least one image sensor of the AV;
causing fault detection to be performed based on the image data; causing a fault notification to be generated using the impact analysis
configuration, wherein the fault notification comprises a fault summary related to the image sensor operation type; and
sending, to the data processing system, the fault notification to perform at least one action to address the fault notification.

16. The system of claim 15, wherein obtaining the impact analysis configuration further comprises receiving the impact analysis configuration from the data processing system.

17. The system of claim 15, wherein the impact analysis configuration further comprises a set of configuration settings for the image sensor operation type, and wherein each configuration setting of the set of configuration settings has a format for a configuration layer.

18. The system of claim 15, wherein causing the fault detection to be performed further comprises:
detecting a plurality of faults; and
aggregating the plurality of faults to obtain a fault aggregation.

19. The system of claim 18, wherein causing the fault notification to be generated further comprises generating the fault notification using the fault aggregation.

20. The system of claim 18, wherein aggregating the plurality of faults further comprises dividing each fault of the plurality of faults into a respective group corresponding to a fault severity level.

* * * * *